United States Patent Office 3,843,349
Patented Oct. 22, 1974

3,843,349
METHOD OF MAKING FINE POWDERS
John E. Ehrreich, Wayland, and Adrian R. Reti, Cambridge, Mass., assignors to Graham Magnetics, Inc., Graham, Tex.
No Drawing. Continuation-in-part of application Ser. No. 228,387, Mar. 24, 1971, which is a continuation-in-part of application Ser. No. 128,812, Mar. 24, 1971, which in turn is a continuation-in-part of application Ser. No. 127,514, Mar. 24, 1971. This application June 6, 1973, Ser. No. 367,461
Int. Cl. H01f 1/06
U.S. Cl. 75—.5 BA
54 Claims

ABSTRACT OF THE DISCLOSURE

Hyperfine, uniformly sized metal particles are reduced from decomposable salts by immersing the salt particles in an organic medium prior to reduction and keeping them in the medium until reduction is completed. The medium keeps the particles from sintering together so that the resulting metal powder is characterized by minimal interparticle agglomeration. The organic medium is then largely removed so that it does not degrade the characteristics of the metal particle.

RELATED APPLICATIONS

This application is a continuation-in-part of the commonly-owned and co-pending U.S. Patent Applications filed by instant inventors as follows:
(a) U.S. Ser. No. 228,387 filed Mar. 24, 1971 and entitled "Cobalt Powders and Their Preparation and Use";
(b) U.S. Ser. No. 128,812 filed Mar. 24, 1971 and entitled "Fine Powders and Method of Making Same," now abandoned;
(c) U.S. Ser. No. 127,514 filed Mar. 24, 1971 and entitled "Metallic Powders and Their Preparation" now abandoned.

The disclosure of these earlier applications is incorporated by reference herein.

BACKGROUND OF THE INVENTION

This invention relates to the preparation of hyperfine metallic powders.

Hyperfine particles are useful in such diverse applications as magnetics, catalysts, pyrotechnics and starting materials for various chemical processes. For example, particles of magnetic metals are employed as the magnetic pigment in magnetic recording tapes, cards, disks, drums and also in permanent magnets, particularly the so-called "plastic" magnets.

On the other hand, the large surface-to-volume ratios of the particles make them highly suitable as catalysts in many cases. This same characteristic is important in various chemical reactions where high reaction rates are desired, the pyrotechnic field coming readily to mind in this connection. This feature of hyperfine particles also helps to bring to completion reactions that might otherwise be inhibited by the buildup of reaction products on the surfaces of the particles.

Hyperfine metallic particles are generally prepared in commercial quantities by reducing the metals from compounds thereof. These compounds are themselves in the form of hyperfine particles, generally as the result of precipitation from solutions of metallic salts.

For example, hyperfine cobalt particles have been made by first adding sodium hydroxide to an aqueous solution of cobalt chloride, thereby precipitating particles of cobalt hydroxide ($Co(OH)_2$). The cobalt is then reduced from the hydroxide by reacting the latter with hydrogen at an elevated temperature.

In our copending application Ser. No. 127,513 for Acicular Salts and Their Preparation, filed on Mar. 24, 1971, we describe the formation of acicular salt particles by a preferred double precipitation process resulting in acicular oxalate particles. The present invention also relates to the reduction of the metal in these particles to provide hyperfine acicular metallic particles.

Unfortunately, the temperature at which reduction takes place is often high enough to cause inter-particle sintering of a substantial portion of the material if the process is carried out on a bulk of reasonable size. Moreover, during such thermal reduction processes, the sintering (or perhaps undetected physical phenomena associated with particle-to-particle proximity and related to the magnetic characteristics of the metallic powders being formed during reduction) substantially reduces the quality of the potential magnetic properties which might otherwise be achieved from the reduced metal. Thus, sintering and other physical effects defeat the very purpose of the process and, accordingly, to the extent that it takes place, there is a concomitant degradation of the desirable characteristics of the product.

Specifically, not only does such sintering increase the size of the resulting particles, it also alters their shapes. Loss of shape characteristics is particularly bothersome when specific particle shapes are desired, an example being the acicularity often desired in magnetic pigments. Accordingly, the purpose of this invention is to provide a process for preparing hyperfine metallic particles which exhibit minimal interparticle sintering as the result of the reduction step.

SUMMARY OF THE INVENTION

We have materially reduced inter-particle agglomeration on sintering by coating the particles in a separation medium prior to reduction and keeping them in the medium until reduction has been completed and the powder has cooled to below the sintering temperature; moreover, we have discovered that surprising improvements have been achieved in magnetic metallic particles produced by the aforesaid coating and reducing process.

The separation medium is an organic material and the reactant particles are immersed in or thoroughly mixed with this material which thus coats the individual particles. During reduction, the coatings may be largely removed or deteriorated by thermal decomposition, evaporation, sublimation or the like processes, but their residues serve to provide the desired inter-particle separation. In many cases, the coating residues will not materially interfere with the desired use of the metallic particles. However, where their removal is preferred, they can largely be washed away with suitable solvents. In appropriate cases, magnetic techniques can also be used at this point to aid in separation.

In certain cases some organic coating material may remain on the particles. This material may bind metallic particles together in random orientations, which tends to detract from the desirable characteristics of the metallic powder, particularly in magnetic applications. However, the extent of this effect is much less than the corresponding degradation resulting from inter-particle sintering when the present invention is not practiced. Indeed, the degradation products of the coating material can be of material benefit even during the advanced stages of the reduction process by radiating heat throughout the porous mass of powder being subjected to reduction.

Polymers and other organic chemicals that have been used as the coating material include such film-forming materials as silicone oil, silicone polymer, silanes, epoxy resin, polyacrylic esters, and polyurethane. Usually, the organic material is applied in a suitable solvent to ensure complete coverage of the oxalate crystals.

We have reduced coated metal oxalate in this fashion to obtain very fine metal powders characterized by minimal inter-particle agglomeration or sintering. Following our procedure, metal oxalate crystals, e.g. iron, cobalt, nickel or copper, are heated to a temperature of approximately 225–410° C. in a gaseous reducing atmosphere such as hydrogen or hydrogen-nitrogen to reduce the metal, e.g. cobalt (or cobalt alloy) and, at the same time, internally sinter the cobalt in each particle. For cobalt-containing particles, the temperature should be above 325° C., because if the reducing temperature falls much below 330° C., the cobalt oxalate crystals do not decompose readily. On the other hand, if the reducing temperature exceeds 400° C., particle interaction starts to occur and the resulting agglomerates degrade the characteristics of the material. In the case of cobalt oxalate, we have found that a temperature of about 325° C. to 370° C. produces optimum results.

Care must be taken when handling the reduced metal particles initially because they are extremely pyrophoric. In practice they are maintained in an oxygen-free atmosphere and then slowly exposed to air. In about eight hours an oxide coating forms on the surface of the particles, which is sufficient to stabilize their further oxidation.

Bulk samples of unoriented acicular cobalt and cobalt-alloy particles made in accordance with this invention exhibit particularly high magnetic coercivity and sigma values (defined as the ratio of the magnetization (M) of the material to its density). They are also characterized by a high degree of squareness (i.e. the ratio of the remanent magnetization ($M_r$) to the saturation magnetization ($M_s$). In practice, masses of unbound particles exhibit coercivities ranging from 400 up to as high as 1200 oersteds. The sigma values of our acicular cobalt powders range from 60 to 137 e.m.u./g., which is significantly greater than the corresponding values exhibited by conventional materials. Finally, our material may have a squareness figure as high as 0.5. These attributes make the magnetic material especially useful as the recording pigment in high-quality recording members.

The particles of the invention have advantageous diameters of 0.02 to 0.5 micron and a typical length of 0.02 to 2.0 microns. They may consist substantially entirely of cobalt or may contain cobalt alloyed with other metals. Nickel alloys have been found to be particularly advantageous. The actual particles which must ultimately be dispersed in a binder will be up to about 1 micron in length and will often be chain-like segments, i.e. acicular, consisting of more spherical elemental particles from about 0.01 microns to 0.2 microns in size, most advantageously from 0.02 to 0.07 microns.

It has been found that organic coatings and their residues keep the chain-type particles sufficiently apart during reduction to prevent excessive sintering at the high temperatures involved in hydrogen reduction. The coating can be such that the bulk of it is removed from the particle by decomposition during pyrolysis and subsequent heat treatment. Also it can be removed by subsequent washing in a suitable solvent. In some cases it may evaporate or sublimate. We intend that all of these processes be embraced within the term "removed." In any event, the coating does not unduly interfere with the physical and magnetic characteristics of the particle.

Polymers and other organic chemicals that have been used as the coating material include silicone oil, silicone polymer, silanes, epoxy resin, polyacrylic ester, and polyurethane. Usually the organic material is applied in a suitable solvent to ensure complete coverage of the oxalate crystals. Alternatively, the particles can be immersed in the organic medium if it is a liquid such as, for example, a liquid hydrocarbon.

In selecting polymer coatings systems for use during reduction of a particular powder, it has been found helpful to subject the candidate polymer to a test comprising heating the polymer as it coats the metal particles at an elevated temperature, say 370° C., for two hours, in a nitrogen atmosphere. In general, those polymers that do not evaporate under test conditions and leave residues of above about 5% (based on the weight of the original polymer), have been found most useful. Most desirable are those polymers that will liquefy during the reduction of the oxalate and before they reach their ultimate state of decomposition. Polyamides are particularly desirable for use with cobalt-bearing particles.

The range of organic material to be decomposed is conveniently from 1 to 15% by weight of the oxalate being reduced. Thus it is preferred that a very significant part of the polymer, preferably about 8% or more be left as residue. However, it is desirable that the major part of the residue be removed before use. In general, the decomposition residue should be less than 5% of the metal content of the oxalate.

Indeed, it is believed, but for the use of such coatings as described above, it would not be possible to achieve the high squareness values of the invention. Squareness values of 0.35 and above are achieved using these coatings during the sintering process, even using old-fashioned oxalate-preparation processes.

Bulk samples of unoriented cobalt particles and cobalt-alloy particles of this invention exhibit particularly high coercivity and sigma values and are characterized by a high degree of squareness. In practice, masses of unbound particles exhibit coercivities ranging from 400 up to over 1000 oersteds. The saturation magnetization values of our acicular cobalt powders range from 60 to 137 e.m.u./g. which is significantly greater than the corresponding values ehxibited by conventional materials. Finally, our materials have a squareness figure as high as 0.6. These attributes make the material especially useful as the recording pigment in high-quality recording members.

The novel material produced by the present invention, and in particular that material having squareness values over 0.35 and coercivities over 500, has a flat coercivity-to-temperature relationship compared to pre-existing ferromagnetic materials.

Coercivity values generally remain above 500 at 100° C. and decrease only about 20% in magnetic coercivity between 0° C. and 100° C. When such materials of the invention have been incorporated into polymer matrices as, for example, are used in fixing ferromagnetic materials to tapes for recording data, the resultant products show a surprisingly higher signal (unbiased sine-wave recording) output over a wider frequency than products heretofore known.

The magnetic measurements on the various samples in this application were done on a vibrating sample magnetometer at the Magnetic Laboratory at the Department of Electrical Engineering at the University of Minnesota. Generally, two hysteresis loops were traced for each sample: one at about 1 kilo-oersted peak-field at a field frequency of 60 Hz. and one at about 8 kilo-oersted field. By measuring the saturation magnetic moment of the sample, one may calculate the fraction of pure cobalt in the sample as follows:

$$\text{Fraction of cobalt} = 4.7/(1+582/M_s)$$

where $M_s$ is the saturation magnetization of the sample in e.m.u./g.

Nickel is a particularly useful metal for use in forming cobalt alloys according to the process of the invention. It has been discovered that use of nickel allows one to more accurately pre-select the magnetic properties of the alloy. This may be because the nickel fits so well into a cobalt lattice system. In any event, the resultant nickel-cobalt alloys are predictably formed. Moreover, such alloys have outstanding resistance to degradation with time. That is, they have improved resistance to oxidation even under conditions of heat or humidity. Nickel alloys containing at least 43%, but preferaby from 60% to 85% cobalt, are the most advantageous materials for use in many magnetic recording applications.

It is not believed that it is possible to form magnetic particles having such an excellent combination of squareness, coercivity and sigma value by any other process unless extraordinary comprises are made in particle size (such that the particles cannot, for example, be formulated into magnetic tapes as the primary magnetic particle therein) or use of non-magnetic elements are incorporated in considerable volumetric quantities into the magnetic particle. Even with such compromises, it is not believed that it has been possible to produce particles compromising over about 43% cobalt in metal content which have an average particle size having at least 0.1 microns in one dimension, a maximum average diameter of 2 microns, a coercivity of at least 600, a squareness of at least 75, and a sigma value of at least 0.4.

Applicants stress, however, that nothing in the foregoing paragraph should be interpreted to teach that anyone has even come close to achieving the special results indicated therein.

ILLUSTRATIVE EXAMPLES OF THE INVENTION

In order to point out more fully the nature of the present invention, the following specific examples are given as illustrative embodiments of the present process and products produced thereby.

Example 1

A quantity of 238 g. of $CoCl_2$ is dissolved in a container to form a 1 liter aqueous solution. Then 100 g. of sodium hydroxide is dissolved in a second container to form a second 1 liter aqueous solution. The cobalt chloride and sodium hydroxide solutions are mixed together, using a magnetic agitator bar, in a 4 liter beaker for three minutes to form a cobalt hydroxide precipitate. Then 135 g. of oxalic acid are dissolved in a separate container to form a 1½ liters aqueous solution. The oxalic acid solution is mixed thoroughly into the cobalt hydroxide precipitate for 5 minutes to form a cobalt oxalate precipitate. The resultant mixture is filtered in a Büchner funnel and washed several times with water. Then it is rinsed several times with acetone and air dried. The resulting cobolt oxalate particles are acicular (i.e., "needle-shaped"). Following this, 0.05 g. of silicone polymer oil (sold under the trade designation G.E. RTV910 Diluent) is mixed with 0.95 g. of the acicular cobalt oxalate particles using sufficient tetrahydrofuran to insure uniform coating of the silicone oil on the particles. Next, the coated particles are air dried. Then the coated particles are charged into a 1-inch diameter glass tube in a tube furnace, heated to 360° C. in a hydrogen atmosphere, and held at this temperature for 1 hour, thereby reducing the metal salt to cobalt. The material is then cooled to room temperature while still in a hydrogen atmosphere, and subjected to a two-minute argon purge. Next the product is washed several times with acetone. A magnet is used to effect separation from the wash, and the separated material is air dried. The resulting product is a strongly magnetic powder having a coercivity of 705 oersteds, a sigma value of 82 e.m.u./g., and a squareness figure of 0.40. The particles are composed mainly of cobalt, and have little or no silicone oil on their surfaces. Also, the cobalt particles are acicular with an average particle size of 0.3 microns in diameter by 1 micron in length.

Example 2

Cobalt particles are prepared as described in Example 1, except that the cobalt oxalate crystals are not coated with silicone oil during their reduction step. Now the resultant cobalt particles have a coercivity of 313 oersteds, a sigma value of 101 e.m.u./g., and a squareness characteristic of only 0.21.

Example 3

Cobalt oxalate crystals are prepared in accordance with Example 1. Then 0.05 g. of silane (sold under the trade designation Dow-Corning Z6020), is mixed with 0.95 g. of oxalate crystals prepared in accordance with Example 1 using a small quantity of tetrahydrofuran as a solvent for the silane to insure coating of the silane on the particles. Then the coated particles are air dried. Following this, the coated metal salt is charged into a glass tube in a tube furnace. The material is heated to 360° C. under an argon atmosphere for one-half hour. It is held at 360° C. under a hydrogen atmosphere for a period of 1 hour. Following this, it is cooled to room temperature while still in a hydrogen atmosphere and then subjected to a 2-minute argon purge. Then the cooled product is washed several times with acetone, using a magnet to effect separation of the particles after each wash, and air dried. The product obtained had a coercivity of 810 oersteds, a sigma value of 72.5 e.m.u./g. and a squareness characteristic of 0.43. The powder was composed of acicular cobalt particles.

Example 4

A quantity of 2.0 grams of 2½% epoxy-solution (5 g. of epoxy sold by Resyn Corporation under the name Resypox 1628, 0.75 g. of tetraethylenepentamine) in tetrahydrofuran is mixed with 0.95 g. of cobalt oxalate prepared in accordance with Example 1, and an additional quantity of 2.05 g. of tetrahydrofuran is added to insure complete coating of the oxalate particles. Then the coated material is air dried. The coated material is charged into a glass tube in a tube furnace, heated to 360° C. in an argon atmosphere for one-half hour, and held at 360° C. in a hydrogen atmosphere for 1 hour. Following this, it is cooled to room temperature while still in a hydrogen atmosphere and subjected to a 2-minute argon purge before being washed several times with acetone. A magnet is used to effect separation of the metal powder from the wash liquid. Thereupon the material is air dried. The dry product has a coercivity of 825 oersteds, a sigma value of 75.5 e.m.u./g. and a squareness characteristic of 0.45. The powder is composed of essentially pure cobalt particles bearing little residual organic coating.

Example 5

A quantity of 2.0 g. of 2½% G.E. SE–33 silicone gumstock dissolved in tetrahydrofuran is mixed with 0.95 g. of cobalt oxalate salt prepared in accordance with Example 1 and with 2.0 grams of tetrahydrofuran to insure complete coating of the salt particles. The coated material is then air dried (mixed). Following this the coated salt particles are charged into a glass tube, placed in a tube furnace, and heated to 360° C. in an argon atmosphere for one-half hour. Then the material is held at this same temperature for 1 hour before being cooled to room temperature while still in the hydrogen atmosphere. Following a 2-minute argon purge, the material is washed with acetone using a magnet to effect separation from each wash liquid, and air dried. The product obtained is a ferromagnetic metallic powder having a coercivity of 750 oersteds, a sigma value of 77 e.m.u./g. and squareness characteristic of 0.42. The powder is composed of acicular cobalt particles.

Example 6

A quantity of 238 g. of $CoCl_2.6H_2O$ is dissolved in a container in 500 ml. of denatured alcohol and 500 ml. of water. Also 80 g. of sodium hydroxide is dissolved in a separate container in 500 ml. of water and 500 ml. of denatured alcohol. Then the solution is cooled to room temperature. Following this, the cobalt chloride and sodium hydroxide solutions are mixed together in a 4 liter beaker in a magnetic mixer for 5 minutes. During this period, a cobalt hydroxide precipitate forms in the beaker. In a separate beaker, 135 g. of oxalic acid are dissolved in 750 ml. denatured alcohol and 750 ml. of water. The oxalic acid solution is mixed into the cobalt hydroxide precipitate for 5 minutes to form a cobalt oxalate precipitate. The precipitate is filtered in a Büchner funnel and the oxalate cake is washed with 2 liters of acetone. Then the oxalate is redispersed in 1 liter of acetone and then filtered. The acetone-wet cake is mixed with 75 grams of 10% solution of Estane 5702, a polyurethane-type rubber, manufactured by B. F. Goodrich & Co. in tetrahydrofuran. This mix is spread on a polyethylene sheet to air dry. Coated oxalate salt is then charged into an aluminum boat which is approximately 16 inches long and 2½ inches wide and 1.9 inches high. The interior of this boat is separated into four elongate compartments by three equally spaced and centered fins. The filled boat is placed in a sealed 2⅞ inch diameter stainless steel tube. The tube in turn is placed in a 3-inch diameter 24 inches long, tube furnace so that the filled aluminum boat is equally distant from each end of the furnace. Argon is fed through the stainless steel tube at a rate of 800 cc. per minute. At the same time, heat is applied to the stainless steel tube and in 1 hour the contents of the boat reaches 360° C. After 30 minutes, the atmosphere is changed to hydrogen, which is passed through the tube at a flow rate of 800 cc. per minute for a period of two hours. The stainless steel tube with the filled aluminum boat therein is taken out of the furnace and cooled externally with ice while still maintaining the boat in a hydrogen atmosphere and the contents allowed to reach room temperature. Finally, a 10-minute argon purge is passed through the tube at a rate of 800 cc. per minute. The contents of the boat are then transferred to a polyethylene bag filled with argon. Care is taken to prevent contact with air, because at this point the material is extremely pyrophoric. After four days, two pinholes are pierced in the bag so that the contents of the bag are exposed to a very slowly increasing oxygen concentration. The product is then removed from the bag after four more days.

The resulting product obtained is ferromagnetic metallic powder having a coercivity of 813 oersteds, a sigma value of 86 e.m.u./g. and a squareness characteristic of 0.46. The powder is non-pyrophoric and is composed of acicular cobalt particles having cobalt oxide coatings and exhibiting minimal interparticle sintering.

Example 7

A quantity of 100 g. of coated cobalt oxalate is prepared in accordance with Example 6 and charged into an aluminum boat. The boat is 16 inches long and 1.72 inches wide and 1.3 inches high and has two equally spaced lengthwise fins which divide the boat into three elongated compartments. The filled boat is charged into a sealed 2-inch diameter stainless steel tube. The tube is then placed in an aluminum muffle in a 3-inch diameter by 24-inch long tube furnace such that the filled aluminum boat is equally distant from each end of the furnace. Argon is then fed through the stainless steel tube at a rate of 400 cc. per minute. At the same time, heat is applied and the stainless steel tube is brought up to 380° C. Ninety minutes after startup, the gas is changed to hydrogen at a rate of 400 cc. per minute and temperature is maintained at 380° C. for 120 minutes. Following this the stainless steel tube containing the filled aluminum boat is taken out of the furnace and cooled externally with ice and the contents allowed to reach room temperature in a hydrogen atmosphere. Then the reactor is purged with argon for ten minutes at a rate of 400 cc. per minute. The contents in the boat are then transferred at a polyethylene bag with an argon atmosphere without allowing air to come into contact with the contents. After four days two holes are pierced in the bag so that the contents of the bag are exposed to oxygen only very gradually. After four more days the contents are removed from the bag. The product obtained is a ferromagnetic powder with a coercivity of 940 oersteds, a sigma value of 98 e.m.u./g. and a squareness characteristic of 0.45. The powder is composed of substantially acicular cobalt particles which carry oxide coatings so that they are stable.

Example 8

Coated oxalate crystals are prepared in accordance with Example 6 except that the acetone wet cake is mixed with 75 g. of epoxy solution (10 grams of epoxy sold by Resyn Corporation under the name Resypox 1628, 1.4 grams of tetraethylenepentamine, 90 grams of acetone). The mix is spread on a sheet of polyethylene and air dried and allowed to cure at room temperature. Following this, a quantity of 100 g. of pre-coated cobalt oxalate is charged into an aluminum boat and reduced in accordance with the procedure described in Example 7. The material obtained is a black ferromagnetic powder having a coercivity of 938 oersteds, a sigma value of 113 e.m.u./g. and a squareness characteristic of 0.50. The powder is comprised of very small acicular cobalt particles with oxide coatings which render them stable.

Example 9

Cobalt oxalate crystals are prepared in accordance with Example 6 except that the acetone wet cobalt oxalate cake is divided into 22 forty-gram batches each batch containing 6.68 grams of cobalt oxalate. Each batch is then sealed in a two-ounce bottle and is stored for use in subsequent work. Following this, 3.5 g. of an acetone solution containing 10% polyurethane sold under the trade designation Estane 5702 by B. F. Goodrich, is mixed with the contents of one bottle. The contents is then emptied from the bottle onto a polyethylene sheet, spread out and air dried. The mix is then charged into a 1-inch diameter glass tube in a tube furnace and heated to 360° C. in an argon atmosphere for 20 minutes. The material is held at this temperature in argon for 25 minutes and held for a further 80 minutes at the same temperature in a hydrogen atmosphere. The mix is then cooled in the hydrogen atmosphere at room temperature and subjected to a two-minutes argon purge. The contents of the tube are then poured into an argon filled polyethylene bag and sealed. After four days, two holes are punched in the bag so that the oxygen gradually contacts the contents of the bag. The material removed from the bag is a ferromagnetic powder having a coercivity of 875 oersteds, a sigma value of 84 e.m.u./g. and a squareness characteristic of 0.415. The powder is composed of ferromagnetic acicular cobalt particles having oxide coatings which render them stable.

Example 10

A quantity of 1.75 grams of an acetone solution containing 10% polyurethane sold under the trade designation Estane 5702 by B. F. Goodrich Co., are mixed with the contents of another bottle of the oxalate in Example 9 and the resulting mix is spread out on a sheet of polyethylene and air dried. This dried mix is charged into a tube and heated as described in Example 9. The resultant product is a ferromagnetic powder having a coercivity of 625 oersteds, a sigma value of 92 e.m.u./g. and a squareness characteristic of 0.31. Again the powder is composed of very small stable acicular cobalt particles.

Example 11

A quantity of 7 grams of the polyurethane solution described in Examples 9 and 10 is mixed with the contents of a third bottle of oxalate stored for use in Example 9. The mix is then spread on a sheet of polyethylene and air dried. Following this the material is reduced as described in Example 9. The product obtained is a ferromagnetic powder having a coercivity of 937 oersteds, a sigma value of 79 e.m.u./g. and a squareness characteristic of 0.46.

Example 12

The coated cobalt oxalate crystals are prepared in accordance with Example 9 except that the bottle contents are mixed with 3.5 grams of a 10% solution of Resypox 1574 solid epoxy sold by Resyn Corporation in acetone. The epoxy contains no curing agent. The resultant mix is spread on a sheet of polyethylene and air dried and reduced to produce a ferromagnetic powder as described in Example 9. The ferromagnetic powder obtained has a coercivity of 875 oersteds, a sigma value of 92 e.m.u./g. and a squareness characteristic of 0.40.

Example 13

A quantity of 3.5 grams of a solution containing 5% Estane 5702 polyurethane and 0.5% of a silica sold under the trade designation HiSil 233 in acetone is mixed with the contents of another bottle of the material in Example 9. The mix is then spread on a sheet of polyethylene and air dried. Following this, is reduced as described in Example 9. The powder obtained has a coercivity of 500 oersteds, a sigma value of 97 e.m.u./g. and a squareness characteristic of 0.30.

Example 14

The material in another bottle of Example 9 is air dried and treated in accordance with that Example except that the cobalt oxalate salt particles are left uncoated. The product obtained is a powder composed of cobalt particles which are substantially sintered together. The material has a coercivity of 313 oersteds, a sigma value of 97 e.m.u./g. and a squareness characteristic of 0.22.

Example 15

A quantity of 12.08 $CoCl_2 \cdot 6H_2O$ and 10.0 g. $FeCl_2 \cdot 4H_2O$ is dissolved in 50 ml. denatured alcohol and 50 ml. of water in a container.

Also 8.0 g. sodium hydroxide is dissolved in 50 ml. alcohol and 50 ml. water in a second container. The two solutions are mixed together in a magnetic stirrer for 2 minutes at room temperature to form an iron-cobalt hydroxide precipitate. Then a quantity of 13.5 g. of oxalic acid dissolved in 75 ml. denatured alcohol and 75 ml. water is mixed with the precipitate for 2 minutes. The resultant mixture is filtered in a Büchner funnel and washed several times with acetone and air dried. Following this, 1.0 g. of the material is coated with a 5% Estane 5702 polyurethane described in Example 10 and charged into a 1 inch diameter glass tube in a tube furnace and heated for 30 minutes at 360° C. in argon then it is held at 360° C. in hydrogen for 90 minutes. Following this it is cooled to room temperature in hydrogen and then subjected to a 2 minute argon purge. The resulting powder was composed of stable iron cobalt particles and had a coercivity of 750 oersteds, a sigma value of 90 e.m.u./g. and a squareness of 0.43.

Example 16

A quantity of 5 g. MO-4232 magnetic iron oxide (made by the Charles Pfizer & Co., Inc.) is mixed with 5 g. of 5% G.E. SE 33 unfilled silicone gumstock in toluene with additional toluene added to make a paste which is then spread and air-dried as described in Example 5. Then 1 g. of this material in an open bottle is charged into a 1 in. diameter glass tube in a tube furnace along with 1 g. of the same iron oxide material uncoated in a second bottle. Both samples are then heated to 410° C. in hydrogen and held at that temperature for 3 hours. The glass tube is then removed from the furnace and cooled in hydrogen to room temperature followed by a 2 min. argon purge. The resultant product from the first bottle (i.e. coated initially) is a fine ferromagnetic powder composed of small unagglomerated iron particles. The bulk powder has a coercivity of 250 oersteds, a sigma value of 87 e.m.u./g. and a squareness value of 0.31. The product from the second bottle (uncoated initially) is also a ferromagnetic powder of iron particles. However, the coercivity is only 150 oersteds, the sigma value is 83 e.m.u./g. and the squareness is only 0.23.

Example 17

A quantity of 19.9 g. $FeCl_2 \cdot 4H_2O$ is dissolved in 50 ml. $H_2O$. Separately, a quantity of 8.0 g. sodium hydroxide is dissolved in 50 ml. denatured alcohol and 50 ml. $H_2O$. These two solutions are mixed together in a magnetic stirrer for 2 minutes to form an iron hydroxide precipitate. Then a solution of 13.5 g. oxalic acid in 75 ml. denatured alcohol and 75 ml. $H_2O$ is mixed into the precipitate for 2 minutes. The resultant precipitate is filtered in a Büchner funnel and washed several times in acetone and air-dried. Then, 1 g. of the material in an open bottle is coated with 5% Estane 5702 polyurethane as described in Example 6 and charged into a 1 in. diameter glass tube in a tube furnace along with a second 1 g. quantity of the oxide material uncoated. Both samples are heated for 30 minutes at 360° C. in argon. They are then held at this same temperature in hydrogen for 90 minutes. They are then cooled to room temperature under hydrogen followed by a 2 minute argon purge. The resultant product from the first bottle is ferromagnetic and composed of small, unagglomerated iron particles. The powder has a coercivity of 690 oersteds, a sigma value of 38 e.m.u./g. and a squareness factor of 0.47. The mass of particles from the second bottle (uncoated) has a coercivity of 560 oersteds, a sigma value of 50 e.m.u./g. and a squareness of 0.36.

Example 18

A quantity of 23.8 g. $NiCl_2 \cdot 4H_2O$ is dissolved in 50 ml. denatured alcohol and 50 ml. $H_2O$. This is then mixed with the sodium hydroxide solution and the oxalic acid solution both as described in Example 17. A 1 g. quantity of this material in a bottle is coated with 5% Estane 5702 polyurethane and charged into a 1 in. diameter glass tube in a tube furnace along with a similar amount of uncoated oxide from a second open bottle. The samples are heated for 30 minutes at 360° C. in argon and held at this temperature under hydrogen for 90 minutes. Then the samples are cooled to room temperature in hydrogen followed by a 2 minute argon purge. The first sample is found to be a very fine powder composed of substantially unagglomerated iron particles. The second sample is a coarser powder with many of the iron particles sintered together.

Example 19

A quantity of 17.0 g. $CuCl_2 \cdot 2H_2O$ is dissolved in 50 ml. denatured alcohol and 50 ml. $H_2O$. This is then processed as described in Example 17 to form copper oxalate crystals. A 1 g. quantity of this material in an open bottle is charged into a 1-inch diameter glass tube in a tube furnace along with a similar quantity of oxide coated with a 5% Estane 5702 polyurethane as described in Example 6. The samples are then heated for 30 minutes to a temperature of 310° C. in argon and held at this temperature in hydrogen for 90 more minutes. Then the material is cooled to room temperature under hydrogen followed by a 2 minute argon purge. The product from the first bottle (uncoated) is a relatively coarse powder of agglomerated copper particles. The second sample (coated) is a finer powder composed of small substantially unagglomerated copper particles.

Example 20

The following three solutions are prepared.

A  20.0 grams methyl ethyl ketone
   0.10 grams of soya lecithin, Yelkins TTS
B  3.7 grams of Estane (5702 F1, B. F. Goodrich Chemical Company
   10.0 grams of methyl ethyl ketone
C  3.7 grams of Saran, F 130, Dow Chemical Company
   0.10 grams of Versilube F–50 silicone oil, General Electric Company
   12.0 grams of methyl ethyl ketone A quantity of 17.0 grams of acicular cobalt powder is prepared as in Example 8. The cobalt powder is added to solution A while mixing in a Waring Industrial Blender and this mixture is allowed to stand for 17 hours. Solution B is then added slowly while mixing in the Waring Blender, and the resulting mixture is poured into a one quart steel jar containing 125 grams of ¼" diameter steel balls. The jar is capped and then shaken for 1.5 hours on a Red Devil Paint Conditioner, Model No. 5110. Then the mixture is separated from the steel balls by straining and weighing. For each 1.0 gram mix obtained, 0.47 grams of solution C was added under the action of the Waring Blender.

The resulting mix is then coated onto 1.42 mil polyethylene terephthalate film with a Bird Film Applicator and then passed over a 1200 gauss bar magnet to achieve particle orientation. The film is dried for 5 minutes at room temperature and then 5 minutes at 100° C. The coated film is then subjected to measurements in a Research Engineering and Development, Inc. B-H meter at 5000 oersted applied field. The tape has a coercivity of 1000 oersteds, a squareness characteristic of 0.6, and a saturation magnetization($M_s$) of 2300 gauss. The volume fraction of cobalt in the coating is 21%. Conventional iron oxide tape prepared in the same way and with the same volume fraction of HR–2SO iron oxide (by Hercules, Inc.) has a coercivity of 250 oersted, a squareness of 0.66 and an $M_s$ value of 1025 gauss.

Example 21

A nickel-cobalt particle is formed using the procedure described below and the following quantities of reactants and solvents:

NaOH solution: 5 lbs., 13 oz. in 72 lbs., 10 oz. of water.
$NiCl_2.6H_2O$ and $CoCl_2$ solution: 4 lbs., 8.5 oz. of former salt and 10 lbs., 8.8 oz. of latter salt in 66 lbs. of water.
Oxalic acid solution: 10 lbs., 12 oz. of acid in 123 lbs. of $H_2O$.
Resymide 1125 solution: 100 grams.
Alcohol added to Resymide solution: 600 grams.

An aqueous solution of $COCl_2$ is prepared. An aqueous solution of sodium hydroxide is poured into the cobalt chloride solution to form a precipitate of cobaltous hydroxide. A color change (to purple) is usually noted after the first 25% of the hydroxide solution has been added. After about two-thirds of the hydroxide solution is added, there is a thickening of the mix and care should be taken to avoid adding the hydroxide so fast that any portion of the thickening mix ceases to be well agitated during addition of the remandier of the hydroxide solution. Agitation is continued for a total of about seven minutes from the start of the hydroxide addition.

Thereupon an aqueous solution of oxalic acid is added to the cobaltous hydroxide slurry. This addition is carried out over about 90 seconds during which time the resulting slurry mixture of metal oxalate acquires tannish-pink hue. After the addition, the slurry is mixed for about 8.5 more minutes before being filtered. The filtration is conveniently carried out in a pressure-filter having paper filter elements on four 18 inch diameter filer plates. The effective pore size of the paper is less than one micron.

It should be noted that the acicular metal oxalate subjected to filtration does not require the use of a filter aid; that is, the metal oxalate has what would be termed in the paper industry a high "freeness." It does not plug the filter and is sufficiently porous to facilitate a fast and effective separation of oxalate particles from the filtrate. It is thought that this characteristic is assignable to the acicular nature of the oxalate particles and a kind of bridging action which prevents a too-dense packing of the filter cake.

The resultant precipitate is washed twice with a mixture of 25% acetone in water. Thereupon, the precipitate is subjected to three more washings, each using acetone, and dried at about 30° C., i.e. at about ambient temperature.

The dried metal oxalate filter cake is placed in a 7½-gallon bowl of a food-type mixer. To this bowl is also charged an ethanol-based solution typically containing 100 grams of a commercially-available polyamide resin solution sold under the trade designation Resymid 1125 by Resyn Corp. After a mixing period of about four minutes, the resulting slurry is spread out on stainless steel pans and dried with circulating air at about 30° C. The dried material is passed with a Number 40 screen and loaded into seven aluminum reactor trays which are 2½ feet by 1 foot by ½ inch deep.

The trays are placed in a reactor so the oxalate contents do not contact the atmosphere within the oven. The reactor is closed and fitted with connections to accommodate the flow of purge gas, and purged with nitrogen for two hours. Then the purge gas is changed from nitrogen to a mixture of 10% hydrogen and 90% nitrogen and the heaters of the reactor are set at 722° F. The temperature rises to the 720° F.–725° F. range over a period of about three hours. After this initial three-hour period, the material is heated within the 700–725° F. for an additional three hours. During the third and fourth hours of this six-hour period a considerable amount of $CO_2$ continues to be evolved from decomposing oxalate.

After a total heating period of from 6–6½ hours, the oven door is opened and room temperature air is allowed to cool the reactor. The contents of the trays are still enclosed in the reactor and are under purge with the nitrogen/hydrogen mixture. After about 2 hours of such cooling, the reactor is taken out of the oven and cooled by being packed in ice for about 30 minutes, then equilibrated in ambient air for another 30 minutes.

The purge gas is now changed to a mixture of 3% oxygen and 97% nitrogen and this gas is used to slowly oxidize the surface of metal particles within the reactor for about fourteen hours.

After the fourteen hour period of controlled surface oxidation, the reactor is opened to the atmosphere, but the material is usually given another three to five hours to equilibrate with the atmosphere before being packaged and sealed in polyethylene bags.

The resultant material has the following magnetic properties:

Sigma value ($\sigma$) _____ 87
Coercivity ($H_c$) _____ 695
Squareness _____ 0.50
$H_s/H_c$ _____ 3.5

In general, such nickel-cobalt particles with coercivity of over 500 and a squareness over about 0.4 seem to provide the most stable and desirable materials for use in magnetic recording applications.

Cobalt powders produced by the process of Example 21 have oil absorption values of from about 0.50 cc. of linseed oil per gram of powder to 2.00 cc. per gram of powder. The variation is primarily caused by the nature and quantity of polymer residue thereon. Such materials also have a surprisingly low apparent bulk density of about 0.15 gram per cubic centimeter.

Example 22

Although the most advantageous particles of the invention are prepared according to the use of oxalate particles formed according to the preferred double precipitation process, particles formed by other processes are also favorably influenced by use of a reduction procedure as used by this invention.

The process described in U.S. Pat. 3,574,685 to Haines is followed in making a small cobalt particle: A solution of 6 grams of $COCl_2 \cdot 6H_2O$ in 75 milliliters of dimethyl sulfoxide was mixed with a solution of 2.5 grams of oxalate acid in 75 milliliters of dimethyl sulfoxide. Thereupon 600 milliliters of water were added to the mixture and the resultant mix was agitated by shaking for 24 hours. Next, a precipitate of cobalt oxalate was recovered with a Büchner filter. The resulting filter cake was washed twice, each time with 100 ml. of water. Then the filter cake was washed three times more, each time with 50 ml. of acetone.

After this washed cobalt oxalate precipitate had been air dried, 1 gram of the cobalt oxalate material was charged into a glass tube and placed in a small furnace. The glass tube was equipped with appropriate connections to facilitate the transport of purge gas therethrough.

The material was purged with hydrogen for five minutes then heated up to 335° C. over a period of about 20 minutes under a hydrogen purge. After 335° C. was reached, it was held for 3 hours, then cooked over a 50 minute period. The hydrogen purge was then discontinued and a nitrogen purge was used for 20 minutes. Thereupon, a mixture was passed over the product, now a metallic powder, for 3.5 hours.

The resulting cobalt powder was measured to have the following properties.

Sigma value ($\sigma$) _____ 137 EMU per grams.
Coercivity ($H_c$) _____ 450 oersteds.
Squareness _____ 0.28.
$H_s/H_c$ _____ 5.9.

Example 23

This example is presented to show the utility of resin coating during the high temperature reduction of cobalt powders manufactured by other than the optimum process.

A cobalt material was prepared according to the procedure of Example 22. A sample of the resultant powder was mixed with a polyamide resin solution. This solution was prepared from 40 grams of a material sold under the trade designation Resymide 1125 by Resyn Corporation and 320 grams of the denatured alcohol. The 0.5 grams of solution was diluted with another gram of alcohol before the cobalt powder was mixed therein. After mixing, the wetted powder was spread out at air dry at about 30° C.

About 0.9 grams of the dried material was placed in a small glass tube and charged to a furnace wherein it was treated under the following temperature-time-gas purge schedule.

| Gas purge | Time | Temperature, during time— |
|---|---|---|
| Nitrogen | 5 minutes | Ambient. |
| Hydrogen | 20 minutes | Ambient, 330° C. |
| Do | 3 hours | 330–360° C. |
| Do | 30 minutes | Cooling. |
| Do | 20 minutes | Do. |

After this the material treated with 3% oxygen and 97% nitrogen over a period of 3.5 hours at about 25° C.

The magnetic properties of the resultant powder were clearly improved over the properties of the powder of Example 20. The squareness was particularly improved.

Sigma value ($\sigma$) _____ 137 EMU per gram.
Coercivity ($H_c$) _____ 525 oersteds.
Squareness _____ 0.37.
$H_s/H_c$ _____ 4.3.

It is of course to be understood that the foregoing examples are intended to be illustrative and that numerous changes can be made in the reactants, proportions, and conditions set forth therein without departing from the spirit of the invention as defined in the appended claims.

What is claimed is:

1. A method of making ferromagnetic particles or metallic particles comprising the steps of coating a mass of particles of a salt of a metal and an organic acid with a film forming organic material reducing said coated salt particles in a gaseous reducing atmosphere to metal particles, and cooling the metal particles below their sintering temperature, said reduction and cooling being carried out while maintaining the metal particles in the presence of either the separation medium or a thermal decomposition residue thereof.

2. The method of preparing particles as defined in Claim 1 wherein the salt is coated with an organic compound which is largely removed by the heat of reduction but whose residues provide the desired separation.

3. The method of preparing particles as defined in Claim 2 and including the additional step of subsequently washing away any remaining residue with a suitable solvent.

4. The method of preparing particles as defined in Claim 2 wherein the metal-containing salt is coated with an organic polymer.

5. The method of preparing particles as defined in Claim 2 wherein the organic compound is selected from the group consisting of polyurethane, silicone, silicone polymer, epoxy resin, polyester, silane and mixtures thereof.

6. The method of preparing particles as defined in Claim 2 wherein the metal-containing salt is an oxalate.

7. The method of preparing metal particles as defined in Claim 1 and including the additional step of controlledly oxidizing the cooled metal particles so as to form oxide surface coatings on the particles to stabilize them.

8. The method of preparing metal ferromagnetic particles characterized by minimal interparticle agglomeration comprising the steps of coating organic salt crystals of a ferromagnetic material with a film-forming organic material and heating the coated salt particles in a reducing atmosphere so that the medium is largely removed by the heat of reduction and the salt particles are reduced to ferromagnetic particles which are kept from sintering together by the medium or its residues.

9. The method of preparing ferromagnetic particles as defined in Claim 8 wherein the reduction step is carried out at a temperature of from 225° C. to 410° C.

10. The method of preparing ferromagnetic particles as defined in Claim 8 and including the additional step of mixing the medium with a suitable solvent prior to applying it to the salt crystals to insure that the medium completely coats the crystals.

11. The method of preparing ferromagnetic particles as defined in Claim 8 and including the additional step of maintaining the reduced ferromagnetic particles in an oxygen-free atmosphere until the particles are cooled to a temperature appreciably below their sintering temperatures.

12. The method of preparing ferromagnetic particles as defined in Claim 11 and including the additional step of controlledly oxidizing the cooled ferromagnetic particles so as to form oxide surface coatings on the particles to stabilize them.

13. The method of preparing ferromagnetic particles as defined in Claim 8 wherein the salt is a cobalt-containing oxalate and the reduction temperature is 325° C. to 410° C.

14. The method of preparing ferromagnetic particles as defined in Claim 13 wherein the medium is at least one compound from the group consisting of polyurethane, epoxy resin, silane, polyester, silicone and silicone polymer.

15. The method of preparing ferromagnetic particles defined in Claim 8 wherein the medium is largely removed by thermal decomposition.

16. A method of making cobalt and cobalt-alloy magnetic particles having a coercivity of 400 to about 1200, a sigma value of 60 to about 137 and a squareness of from 0.40 to 0.5 comprising the steps of
   (1) coating a mass of particles of a salt which is the reaction product of an organic acid and a metal selected from the group consisting of cobalt and cobalt alloys with a coating of organic resin,
   (2) subjecting the resultant coated salt particles to a thermal reduction step in a gaseous atmosphere to form metal particles, and
   (3) cooling the metal particles below their sintering temperature, said reduction and cooling being carried out while maintaining the metal particles in the presence of either the separation medium or the residue formed by the thermal decomposition of said medium.

17. A method as defined in Claim 16 wherein said salt forms a major portion of the mass of said coated particles subjected to said thermal reduction step.

18. A method as defined in Claim 16 wherein said salt is formed of a metal and a dibasic organic acid.

19. A method as defined in Claim 16 wherein said acid is oxalic acid.

20. A method as defined in Claim 17 wherein said acid is oxalic acid.

21. A method as defined in Claim 18 wherein said acid is oxalic acid.

22. A method as defined in Claim 1 wherein said salt forms a major portion of the mass of said coated particles subjected to said thermal reduction step.

23. A method as defined in Claim 1 wherein said salt is formed of a metal and a dibasic organic acid.

24. A method as defined in Claim 1 wherein said acid is oxalic acid.

25. A method as defined in Claim 8 wherein said salt is formed of a metal and a dibasic organic acid.

26. A method as defined in Claim 23 wherein said acid is oxalic acid.

27. A method as defined in Claim 16 wherein said mass of particles is placed into the reduction step as a porous, particulate mass.

28. A method as defined in Claim 17 wherein said mass of particles is placed into the reduction step as a porous, particulate mass.

29. A method as defined in Claim 18 wherein said mass of particles is placed into the reduction step as a porous, particulate mass.

30. A method as defined in Claim 19 wherein said mass of particles is placed into the reduction step as a porous, particulate mass.

31. A method as defined in Claim 1 wherein the separation medium is from 1 to 15% by weight of the salt coated with said medium.

32. A method as defined in Claim 1 wherein any decomposition residue is less than 5% by weight of the metal content of said salt.

33. A method as defined in Claim 1 wherein said separation medium is an organic polymer which liquefies during said reducing of said salt particles to metal particles.

34. A method as defined in Claim 31 wherein any decomposition residue is less than 5% by weight of the metal content of said salt.

35. A method as defined in Claim 32 wherein said separation medium is an organic polymer which liquefies during said reducing of said salt particles to metal particles.

36. A method as defined in Claim 31 wherein said separation medium is an organic polymer which liquefies during said reducing of said salt particles to metal particles.

37. A method as defined in Claim 16 wherein the organic resin is from 1 to 15% by weight of the salt coated with said resin.

38. A method as defined in Claim 16 wherein any decomposition residue of said resin is less than 5% by weight of the metal content of said salt.

39. A method as defined in Claim 16 wherein said organic resin liquefies during said reducing of said salt particles to metal particles.

40. A method as defined in Claim 37 wherein any decomposition residue of said resin is less than 5% by weight of the metal content of said salt.

41. A method as defined in Claim 38 wherein said organic resin liquefies during said reducing of said salt particles to metal particles.

42. A method as defined in Claim 37 wherein said organic resin liquefies during said reducing of said salt particles to metal particles.

43. A method as defined in Claim 27 wherein the organic resin is from 1 to 15% by weight of the salt coated with said resin.

44. A method as defined in Claim 27 wherein any decomposition residue of said resin is less than 5% by weight of the metal content of said salt.

45. A method as defined in Claim 27 wherein said organic resin liquefies during said reducing of said salt particles to metal particles.

46. A method as defined in Claim 43 wherein any decomposition residue of said resin is less than 5% by weight of the metal content of said salt.

47. A method as defined in Claim 44 wherein said organic resin liquefies during said reducing of said salt particles to metal particles.

48. A method as defined in Claim 43 wherein said organic resin liquefies during said reducing of said salt particles to metal particles.

49. A method as defined in Claim 29 wherein the organic resin is from 1 to 15% by weight of the salt coated with said resin.

50. A method as defined in Claim 29 wherein any decomposition residue of said resin is less than 5% by weight of the metal content of said salt.

51. A method as defined in Claim 29 wherein said organic resin liquefies during said reducing of said salt particles to metal particles.

52. A method as defined in Claim 49 wherein any decomposition residue of said resin is less than 5% by weight of the metal content of said salt.

53. A method as defined in Claim 50 wherein said organic resin liquefies during said reducing of said salt particles to metal particles.

54. A method as defined in Claim 49 wherein said organic resin liquefies during said reducing of said salt particles to metal particles.

References Cited
UNITED STATES PATENTS
3,625,673  12/1971  Lindquist _____ 25—15 AC
3,711,274  1/1973  Montino _____ 25—15 A L. DEWAYNE RUTLEDGE, Primary Examiner A. J. STEINER, Assistant Examiner U.S. Cl. X.R.

148—105